United States Patent [19]

Hehl

[11] 4,340,346
[45] Jul. 20, 1982

[54] MECHANICAL SAFETY COVER INTERLOCK FOR INJECTION MOLDING MACHINE

[76] Inventor: Karl Hehl, Arthur-Hehl-Strasse 32, 7298 Lossburg 1, Fed. Rep. of Germany

[21] Appl. No.: 170,920

[22] Filed: Jul. 21, 1980

[30] Foreign Application Priority Data

Jul. 21, 1979 [DE] Fed. Rep. of Germany ....... 2929676

[51] Int. Cl.³ .............................................. B29F 1/00
[52] U.S. Cl. .................................................. 425/152
[58] Field of Search ......................................... 425/152

[56] References Cited

U.S. PATENT DOCUMENTS 3,744,949 7/1973 Hehl .............................. 425/152 X
3,804,003 4/1974 Hehl .............................. 425/152 X
4,113,414 9/1978 Hehl .................................. 425/152
4,162,878 7/1979 Puglisi ............................... 425/152

Primary Examiner—Thomas P. Pavelko
Attorney, Agent, or Firm—Joseph A. Geiger

[57] ABSTRACT

A mechanical interlock mechanism for the safety cover of the die closing unit of an injection molding machine which has two arresting rods attached to the movable die carrier frame and extending rearwardly through a stationary cylinder head plate, where pairs of toothed arresting jaws are movable into and out of engagement with toothed surfaces of the arresting rods to block their advance, in response to an opening movement of the safety cover which, through two attached control rods, moves the arresting jaws by means of cam surfaces and cooperating cam followers and drive links.

12 Claims, 6 Drawing Figures

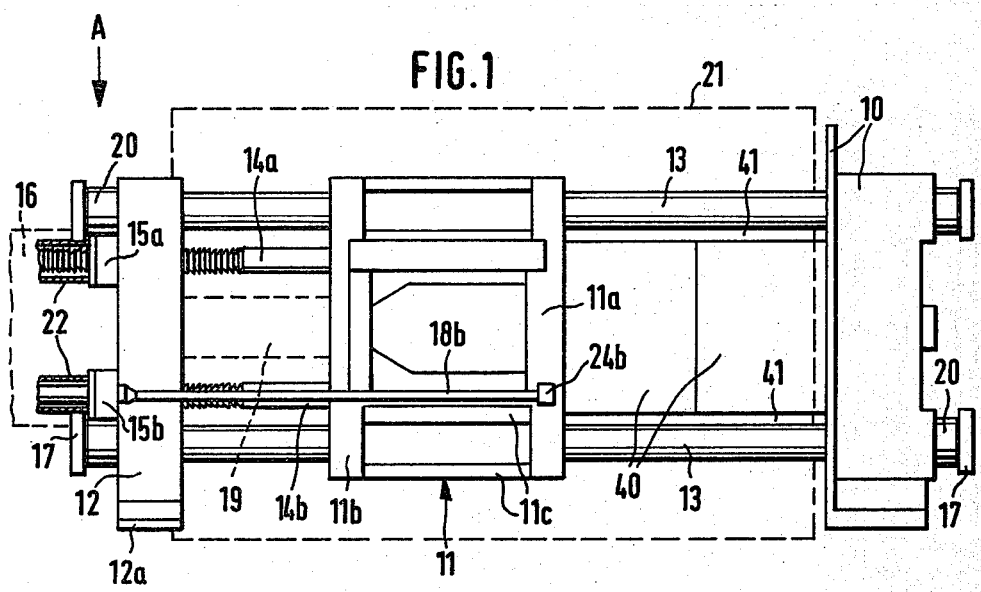
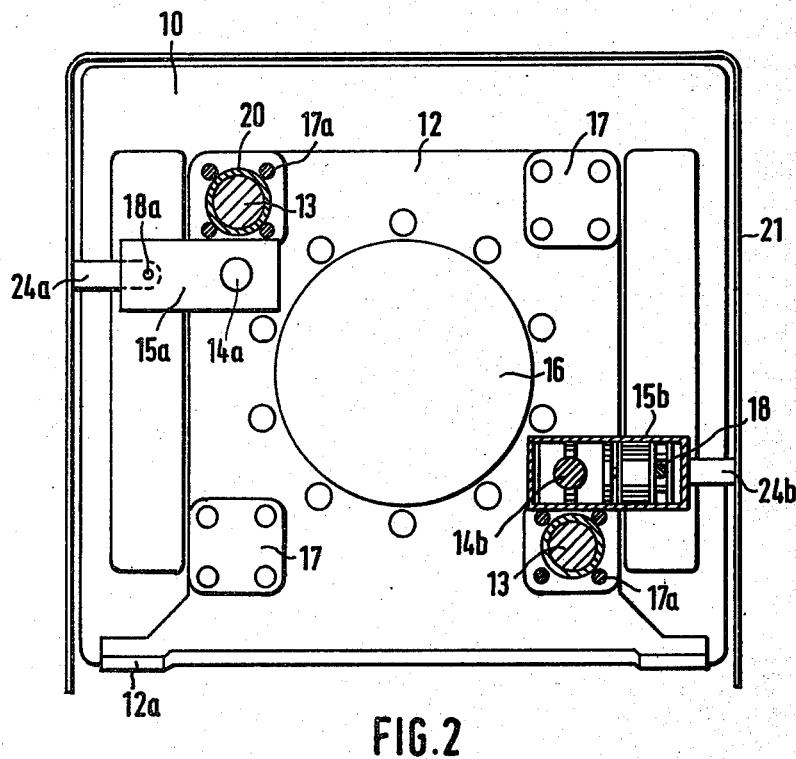

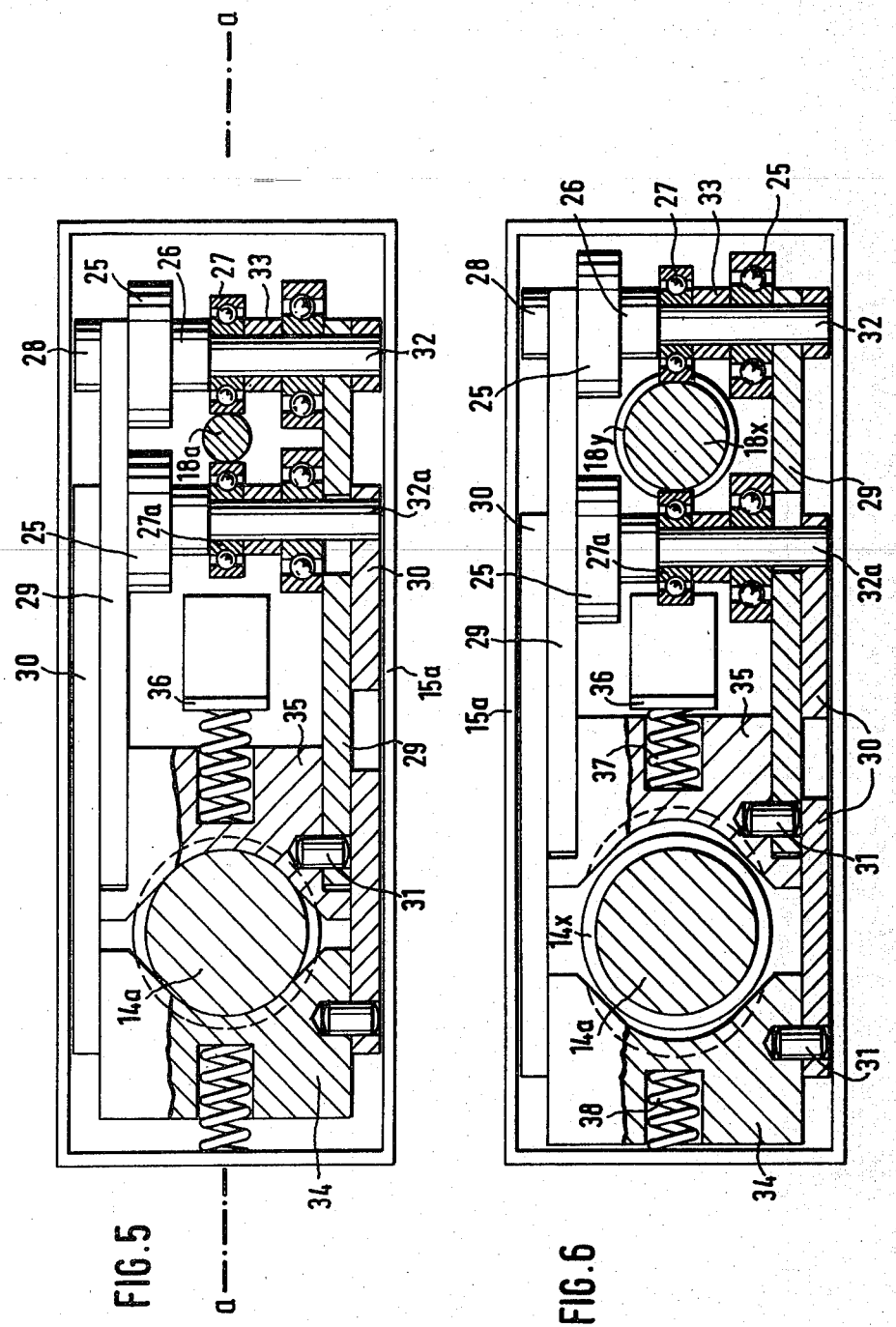

MECHANICAL SAFETY COVER INTERLOCK FOR INJECTION MOLDING MACHINE

BACKGROUND OF THE INVENTION

1. Field of the Invention

The present invention relates to injection molding machines, and, more particularly, to a mechanical interlock mechanism for the safety cover of the die closing unit of an injection molding machine, intended to prevent access to the injection molding die, when the die closing unit moves from the open position to a closed position.

2. Description of the Prior Art

It is a general safety requirement for injection molding machines to include a safety gate or safety cover which encloses the area of its injection molding die and which, in order to prevent injury to a machine operator, includes an interlock device which blocks the operation of the machine, when the safety cover is not in its closed position.

From the prior art in this field are known three different types of safety cover interlock devices: The interlock device may be of the electrical type, using one or several limit switches which, when the safety cover is moved from its closed position, interrupt the drive motor circuit and/or block the operation of other electrical components of the machine; it may be of the hydraulic type, using one or more hydraulic shutoff valves which, when actuated by cam surfaces which move with the safety cover, block the operation of the hydraulic drive circuit of the die closing unit; or it may be of the mechanical type, using a motion arresting mechanism which mechanically blocks the die closing movement by interposing an arresting member, when the safety cover is in its closed position.

Experience has shown that, in spite of the posting of safety rules and warnings, and, in spite of the known risk of potentially great personal injury, some operators and mechanics will attempt to inactivate and circumvent any safety interlock device, if the possibility to do so exists. It has therefore already been suggested to utilize multiple safety interlocks—preferably of all three above-mentioned types—and to arrange these interlock devices in a tamper-proof manner, so that even an experienced mechanic will not be able to defeat their purpose.

In U.S. Pat. No. 4,113,414 is disclosed such a tamper-proof safety cover for the die closing unit of an injection molding machine with multiple tamper-proof safety interlock devices. The displacement of the safety cover away from its closed position actuates electrical limit switches as well as a hydraulic shutoff valve, all of them being inaccessibly enclosed within a sealed housing. A separate mechanical motion arresting device blocks the advance of the movable die carrier towards its closed position, when the safety cover is not in the closed position. This mechanical arresting device consists of a push rod which extends axially forwardly from the movable die carrier plate, laterally outside of the injection molding die, and through a bore of the stationary die carrier plate. That bore is interrupted by a larger cross bore which accommodates a spring-loaded tumbler with a bore portion which is aligned with the die carrier bore, only when it is moved into that position by a control rod which moves with the safety cover. This control rod is retracted, when the safety cover is displaced from its closed position, thus allowing the spring-loaded tumbler to move into a position in which it blocks the advance of the push rod, thereby arresting the closing movement of the movable die carrier plate. A similar tumbler-type mechanical interlock mechanism is disclosed in German Pat. No. 15 29 779. These devices have the disadvantage that they create canting forces in the die closing unit and, if duplicated to be arranged on opposite sides of the injection molding die, present a restriction to the access to the latter.

In U.S. Pat. No. 3,386,133 is suggested another mechanical safety cover interlock mechanism, which is arranged in a knee-lever-type die closing unit. This mechanism includes two transversely spaced guide rods which extend axially rearwardly from the movable die carrier plate and reach through and beyond two bores of a stationary thrust plate which serves as a support for the knee lever mechanism. One of the protruding guide rod portions is provided with sawtooth-like notches which are arranged to cooperate with an arresting pawl. The latter executes a pivoting movement in response to a cover-connected cam and linkage mechanism, in such a way that the pawl engages a guide rod notch, when the safety cover is moved from its closed position. The engaged arresting pawl blocks the advance of the guide rod and of the movable die carrier plate.

A very similar interlock device is suggested in U.S. Pat. No. 3,728,057. It differs from the mechanism just described primarily in the manner in which longitudinal position adjustments of the stationary thrust plate are automatically compensated for with respect to the cover-actuated pawl control mechanism. However, neither of these two devices is tamper-proof, the rod-blocking action of the arresting pawl being easily defeated by simply holding the pawl in a raised position, out of engagement with the guide rod. An additional disadvantage of these devices is that they utilize only one of the two guide rods for cooperation with the arresting mechanism and that the latter is subject to elevated localized pressures which occur under off-center abutment conditions.

SUMMARY OF THE INVENTION

Underlying the present invention is the primary objective of overcoming the shortcomings of the above-described prior art mechanical interlock devices by providing an improved safety cover interlock mechanism which is tamper-proof and which, without in any way reducing the accessibility of the injection molding die, produces an extremely robust and reliable mechanical motion-arresting action for the die closing unit.

The present invention proposes to attain this objective by suggesting a mechanical safety cover interlock mechanism for a push-type die closing unit which features at least one, and preferably two, arresting rods which are arranged diagonally opposite the longitudinal axis of the die closing unit and which have one extremity attached to the movable die carrier frame, while extending axially rearwardly through matching bores of the stationary head plate of the power cylinder. Both arresting rods have on their rearwardly protruding length portions a series of annular grooves with planar abutment faces, and each arresting rod reaches through an arresting unit whose movable parts are enclosed within an inaccessible housing which is attached to the rear side of the cylinder head plate.

In a preferred embodiment of the invention, each arresting unit features two arresting jaws which move into and out of engagement with the annular grooves of the arresting rod, engaging the latter from diametrally opposite sides, in the manner of a split spindle nut. The closing movement of the arresting jaws is provided by preloaded compression springs, and the opening movement is obtained by means of an axially moving control rod which is attached to the safety cover. Two pairs of drive links connect the arresting jaws to cam followers which ride on rotational cam surfaces of the control rod.

The safety cover interlock mechanism of the invention has the advantage of being a compact assembly which is absolutely tamper-proof. Another advantage of this device resides in the fact that the control member of the safety cover which disengages the interlock mechanism is a simple axially extending rod which has one extremity attached to the safety cover, carrying its control cam surfaces on the other extremity.

BRIEF DESCRIPTION OF THE DRAWINGS

Further special features and advantages of the invention will become apparent from the description following below, when taken together with the accompanying drawings which illustrate, by way of example, an embodiment of the invention which is represented in the various figures as follows:

FIG. 1 shows, in a somewhat schematic elevational side view, a push-type die closing unit with four tie rods which is equipped with the safety cover interlock mechanism of the invention, the safety cover and a portion of the power cylinder being shown in phantom lines;

FIG. 2 represents an enlarged end view of the die closing unit of FIG. 1, as seen from the axial side on which the power cylinder is located;

FIG. 5 is an elevational view of the arresting unit of FIGS. 3 and 4, showing the arresting unit mechanism in its engaged position; and FIG. 6 is similar to FIG. 5, showing the arresting unit mechanism in its normal, disengaged position.

DESCRIPTION OF THE PREFERRED EMBODIMENT

Figure 3:
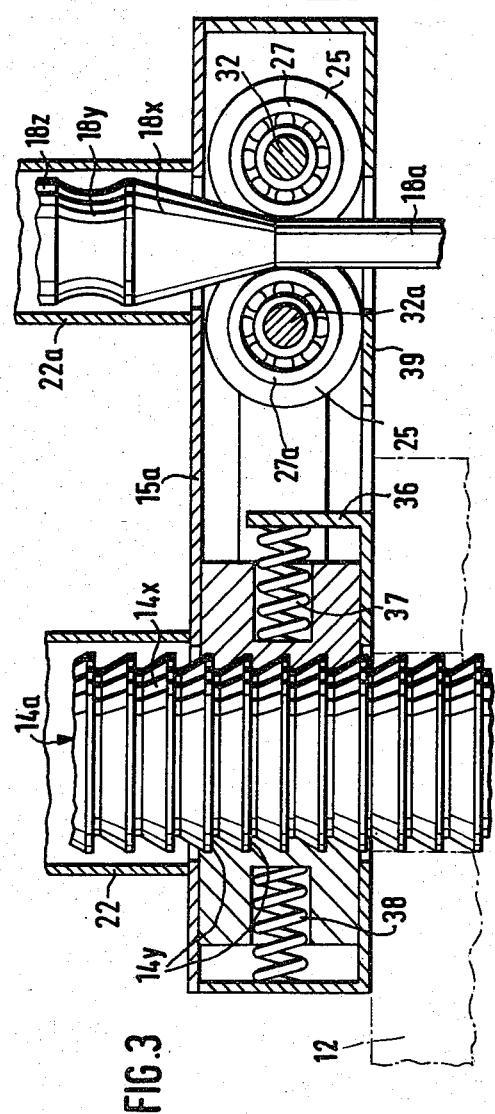
FIG. 3 shows an arresting unit of the safety cover interlock mechanism of the invention, as seen in a horizontally cross-sectioned plan view (arrow A in FIG. 1)

In FIG. 1 are shown the major components of a push-type die closing unit of the type which has four tie rods. This unit, which may be mounted on the machine base of an injection molding machine in one of several mounting orientations, is most commonly arranged horizontally, bolted to the horizontal top surface of the machine base. The die closing unit consists essentially of a stationary die carrier plate 10 and, at an axial distance from the latter, a stationary cylinder head plate 12, the two plates being connected by means of four heavy tie rods 13 which are axially preloaded at their plate connections, thus forming a rigid guide frame for a movable die carrier frame 11. The latter includes a die mounting wall 11a on its axially forwardly facing side, a pressure transfer wall 11b on its rearwardly facing side, and longitudinal pressure transfer ribs 11c which extend between the front and rear walls of frame 11 to form a rigid member. Between the die mounting wall 11a of the movable die carrier frame 11 and the rearwardly facing wall of the stationary die carrier plate 10 are arranged the two halves of an injection molding die 40. A heavy power cylinder 16 is bolted centrally to the rear side of the cylinder head plate 12, the forward extremity of its piston rod 19 being attached to the pressure transfer wall 11b of the die carrier frame 11, thus transmitting to the latter its opening and closing movements as well as an elevated die closing pressure.

The four tie rods 13 have specially adapted plate connection extremities with which they engage fitting bores of the stationary die carrier plate 10 and cylinder head plate 12, protruding axially beyond the outer faces of the two plates with threaded end portions which carry adjustable tie rod abutment nuts 20. Each tie rod connection further includes a tie rod clamping plate 17 which bears against the tie rod extremity, clamping the latter axially against the stationary plate by means of four clamping bolts 17a (see FIG. 2). The result is a tie rod connection which is axially preloaded in the same direction in which the tie rod pulls on the connection, when the power cylinder 16 applies its die closing pressure. A detailed description of such a die closing unit with axially preloaded tie rod connections can be found in U.S. Pat. No. 4,080,144, for example.

As can be seen in FIG. 2, three sides of the die closing unit of the invention are enclosed within a safety cover 21 which has the shape of an inverted "U". In the longitudinal sense, this safety cover extends over the full distance between the two stationary plates 10 and 12. Alternatively, two safety covers may be arranged to be movable over or into each other in a telescopic fashion. The safety cover 21 is carried and guided for axial opening and closing movements, using several axial guide rods which are not shown for reasons of clarity of the drawing. A suitable safety cover guide arrangement is disclosed in U.S. Pat. No. 3,804,003. In order to gain access to the die area 41, the safety cover 21 is opened by moving it rearwardly, in the direction of the power cylinder 16.

FIG. 2 shows that the axes of the four tie rods 13 of the die closing unit are arranged in the four corners of a square and that the unit further includes two arresting rods 14a and 14b which are located in the vicinity of two diagonally oppositely located tie rods. Surrounding the arresting rods 14a and 14b are two box-shaped arresting units 15. The forward extremities of the arresting rods 14a and 14b are attached to the pressure transfer wall 11b of the movable die carrier frame 11. From there, the two rods reach axially rearwardly through matching bores (not shown) in the stationary cylinder head plate 12, their length being such that they protrude beyond the rear face of plate 12 in all positions of the movable die carrier frame 11.

The two boxed-shaped arresting units 15 are identical in construction, having their arresting mechanisms enclosed within housings 15a and 15b of rectangular outline which are attached to the rear side of the cylinder head plate 12 in such a way that approximately one-half of the length of each housing protrudes laterally over the edge of the cylinder head plate 12. The arresting rods 14a and 14b reach through the attached portion of the two arresting unit housings 15a and 15b, respectively, and two associated control rods 18a and 18b reach through the overhanging portions of the arresting unit housings. The two control rods 18a and 18b extend axially in parallel alignment with the arresting rods 14a and 14b, having their forward extremities attached to the safety cover 21 by means of control rod fastener elements 24a and 24b.

Figure 4:
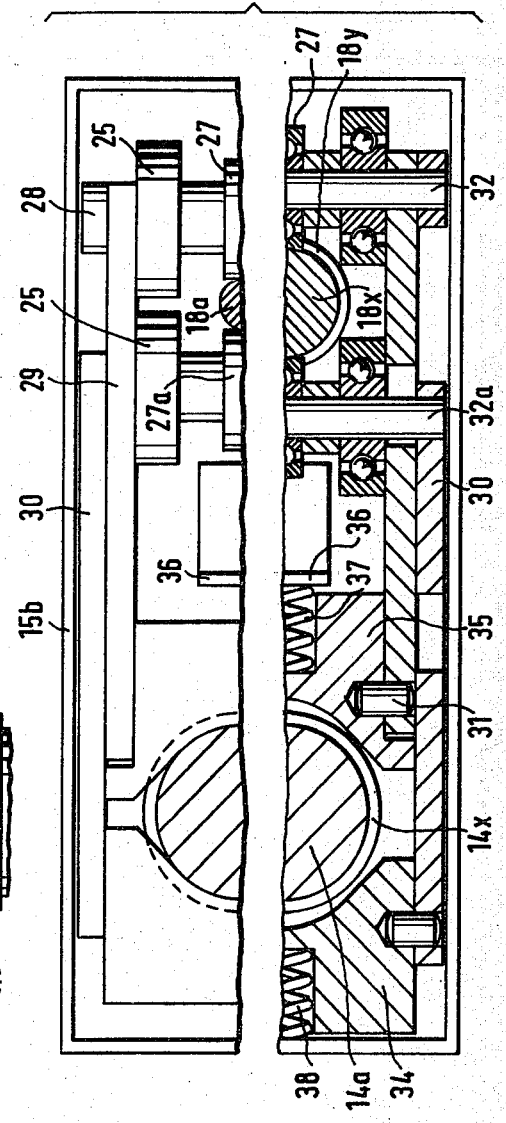
FIG. 4 shows the arresting unit of FIG. 3 in an elevational view, the upper half of the figure showing the arresting unit mechanism in the engaged position, and the lower half of the figure showing the arresting unit cross-sectioned and in the disengaged position.

FIGS. 3 and 4 show details of the component parts of one of the arresting units. In FIG. 3 it can be seen that all parts of the arresting mechanism of this arresting unit are enclosed within an inaccessible rectangular housing and that the arresting rod 14a and its associated control rod 18a move through appropriate openings in the top and bottom walls of the housing 15a. Arranged inside the housing 15a, and guided by its walls, are two arresting jaws 34 and 35 which face the enclosed length portion of the arresting rod 14a from diametrally opposite sides in such a way that the engagement and disengagement displacements of the jaws 34 and 35 take place in the longitudinal sense of the arresting unit housing 15a and transversely to the axis of the arresting rod 14a.

As can be seen in FIGS. 1 and 3, the arresting rods 14a and 14b have each a rear length portion which carries serrations in the form of a series of annular grooves having a sawtooth-shaped outline. The two arresting jaws 34 and 35 of the arresting unit 15 have matchingly serrated inner surfaces so that, when they are engaged radially against the arresting rod 14a, four tooth shapes of the arresting jaws 34 and 35 engage a group of four annular grooves of the arresting rod 14a. In this position, the grooves of the arresting rod 14a have their planar annular abutment faces 14y engaged against matching planar abutment faces of the two arresting jaws 34 and 35, so that a positive mechanical connection is established between the arresting rod 14a and the jaws 34 and 35, with the result that the jaws lock the arresting rod in place, thereby preventing it and the attached movable die carrier frame 11 from executing or continuing a closing movement in the forward direction. The tapered back sides 14x of the ridges between the arresting grooves on the arresting rod 14a serve as a reinforcement for the abutment faces 14y. They also make it possible for the arresting rod 14a to be moved rearwardly in the die opening sense, even when the arresting jaws 34 and 35 are engaged against the arresting rod 14a.

The arresting jaws 34 and 35 have a certain similarity with the lever-closable split spindle nut of a lathe. The simultaneous but opposite engagement and disengagement movements of the two arresting jaws 34 and 35 are obtained by means of a rotational control cam 18x, 18y on the control rod 18a which is engaged on diametrally opposite sides by two cam followers 27 and 27a. The latter transmit their displacements directly to the arresting jaws 34 and 35. For this purpose, the control rod 18a has a major length portion of minimal diameter, followed by a tapered length portion 18x which leads to a short length portion of maximum diameter. The latter is additionally provided with a shallow annular detent grooves 18y which is located immediately behind the conical cam portion 18x of the control rod 18a. Surrounding and protecting the protruding enlarged end portion of the control rod 18a in all positions of the safety cover 21 is a tubular sheath 22a. A similar tubular sheath 22 surrounds the rearwardly protruding portion of the arresting rod 14a.

The cam followers 27 and 27a execute opposing linear movements, being guided for these movements by two pairs of guide rollers 25 and 25a of a diameter which is slightly smaller than the inner height of the arresting unit housing 15a (FIG. 3). The guide rollers 25 and 25a bear against a guide plate 39 which has a tempered guide surface and is formed by the bottom side of the housing 15a. Two transversely extending shafts 32 and 32a carry each a central cam follower 27 or 27a, respectively, and a pair of guide rollers 25 or 25a, respectively which are spaced on opposite sides of the cam follower, using suitable spacer sleeves 26 and 33. Both the cam followers 27 and 26a and the guide rollers 25 and 25a are preferably simple ball bearings.

Each of the two shafts 32 and 32a also carries a pair of drive links 29 and 30, respectively, the opposite extremities of each pair of drive links being attached to one of the two arresting jaws 34 or 35. As can best be seen in FIGS. 5 and 6, the two pairs of drive links 29 and 30 are of identical shape and length, so that the arresting jaws 34 and 35 execute the same linear motions as do their cam followers 27a and 27. This is accomplished by arranging the pair of drive links 29 which is connected to the distal shaft 32 on the inside of the pair of drive links 30 which is connected to the proximate shaft 32a. The inner pair of drive links therefore requires a non-connecting aperture for the proximate shaft 32a which is large enough to allow for the relative movements between the two shafts 32 and 32a. Both shafts are preferably just slightly shorter than the inner width of the housing 15a. The sum of the widths of the cam follower 27a, spacer sleeves 26 and 33, guide rollers 25 and 25a, and of the two pairs of drive links 29 and 30 is preferably identical to the length of the shaft 32a, so that no lateral positioning elements are required for any of the components. The same result is achieved on the shaft 32, where the width of the outer drive links 30 is occupied by a pair of end collars 28.

Each pair of drive links 29 and 30 is connected to one arresting jaw 35 or 34, respectively, using simple link pins 31 for this purpose. Because the drive links are laterally constrained between the side walls of the housing 15a and the arresting jaws 34 and 35, no special lateral positioning elements are necessary at the link pins 31. The arresting jaws 34 and 35 are similarly guided by the walls of the housing 18a, so that a direct straight-line-motion connection is established between the distal cam follower 27 and the proximate arresting jaw 35, on the one hand, and between the proximate cam follower 27a and the distal arresting jaw, on the other hand. The alignment of the two cam followers with the arresting jaws and the symmetrical arrangement of the shafts, guide rollers, and drive links with respect to the cam followers and arresting jaws assure a cant-free operation of the arresting unit.

The engagement motions of the arresting jaws 34 and 35 against the arresting rod 14a are produced by two compression springs 38 and 37, respectively, which are arranged inside blind bores of the two arresting jaws, the spring 38 of the distal arresting jaw 34 bearing against an end wall of the housing 15a, while the spring 37 of the proximate arresting jaw 35 bears against an upstanding bracket 36 which is formed as an upended integral wall portion of the bottom wall of the housing 15a (see FIG. 3).

The safety cover interlock mechanism described above operates as follows: The normal position of the arresting mechanism is the one in which the arresting jaws 34 and 35 are disengaged, as shown in the lower part of FIG. 4 and in FIG. 6. This position allows the power cylinder 16 to execute die opening and closing movements by means of the attached movable die carrier frame 11. The arresting rods 14a and 14b execute the same movements past the disengaged arresting jaws 34 and 35. In order for the arresting mechanism to assume this position, the safety cover 21 must be in its closed position, as reflected by a longitudinal position of the control rod 18a in which the cam followers 27 and 27a are engaged in the detent groove 18y of the enlarged end portion 18z of the control rod. In this position of the cam followers 27 and 27a, their shafts 32 and 32a and the connected arresting jaws 34 and 35 are held apart at such a distance that no contact between the arresting jaws and the arresting rod 14a or 14b is possible. The springs 37 and 38 are in a compressed state, thus producing an engagement bias between the arresting jaws 34 and 35 and a cam follower preload against the bottom of the detent groove 18y, at diametrally opposite points of the latter.

An opening movement of the safety cover 21, even if only over a distance of two inches, displaces the control rods 18a and 18b by the same distance, so that the cam followers 27 and 27a of the arresting mechanisms are allowed to execute an approaching movement, as a result of the movement of the tapered cam portion 18x between them. This approach movement of the cam followers and a corresponding engaging movement of the arresting jaws 34 and 35 are produced by the compression springs 37 and 38. The fully engaged position of the arresting jaws 34 and 35 is shown in FIG. 3 and in the upper portion of FIG. 4, as well as in FIG. 5. As has been mentioned further above, the fully engaged arresting jaws 34 and 35 effectively prevent the arresting rods 14a and 14b from moving in the direction of die closing advance, so that no pressure in the power cylinder 16 is capable of closing the injection molding die.

In the engaged position of the arresting jaws 34 and 35, the latter bear radially against the arresting rod 14a or 14b, respectively, so that the preload of the compression springs 37 and 38 is not transmitted to the drive links 29 and 30. The cam followers 27 and 28 will therefore not ride on the main portion 18a of the control rod and the latter moves practically without frictional load through the arresting unit housing 15a or 15b, as the safety cover 21 is fully opened. The same condition exists, when the safety cover is moved from its fully open position to its closed position. Only when it reaches a point approximately two inches ahead of its closed position, will the cam followers 27 and 27a engage the tapered cam portion 18x, after which the safety cover movement will have to provide the necessary pull on its control rods 18a and 18b, in order to forcibly separate the two cam followers and their connected arresting jaws, until the latter are disengaged from the arresting rod. Over the last inch of the closing movement of the safety cover 21, the arresting mechanism is in the disengaged position. The detent action of the groove 18y with the cam followers 27 and 27a, under the pressure exerted by the springs 37 and 38, gives the closed safety cover 21 a certain hold in the form of a higher initial opening resistance.

If the safety cover is opened during operation of the machine, and if electrical and/or hydraulic safety interlock devices are not present, or have been rendered ineffective, then the arresting jaws 34 and 35 will again be allowed to move radially against the arresting rod 14a, or 14b, respectively. If, at this time, the arresting rods 14a and 14b execute a forward movement, as a result of the injection molding die being closed, then the arresting jaws 34 and 35 will snap into the annular grooves of the arresting rods, as soon as they are longitudinally aligned with the jaws 34 and 35. The arresting mechanism will thus catch and block the die closing movement of the power cylinder 16 on the spot, when the safety cover 21 is opened in the course of the die closing stroke of the die closing unit. If, on the other hand, the safety cover 21 is opened during the die opening stroke of the machine, then the arresting jaws 34 and 35 will operate like ratchet pawls, riding over the inclined back sides 14x of the annular grooves, until the die opening movement is terminated. At this point, the arresting jaws 34 and 35 are free to fully engage the arresting grooves of the rod 14a or 14b.

As can be seen in FIGS. 3–6, the arresting unit housing 15a fully encloses the components of the arresting mechanism, so that it is not possible for a machine operator to defeat the action of this mechanical safety cover interlock mechanism by attempting to forcibly hold the arresting jaws apart, or by attempting to prevent their engagement motion in any other way.

It should be understood, of course, that the foregoing disclosure describes only a preferred embodiment of the invention and that it is intended to encompass within it all changes and modifications of this example of the invention which fall within the scope of the appended claims.

I claim the following:

1. In the die closing unit of an injection molding machine which has a stationary die half mounted on a stationary die carrier member and a movable die half mounted on a movable die carrier member and a plurality of tie rods guiding the movable die carrier member for axial die opening and closing movements while forming a rigid connection between the stationary die carrier member and a stationary support member located axially behind the movable die carrier member and an axially rearwardly retractable safety cover enclosing at least a portion of the die closing unit, in said die closing unit, a mechanical safety cover interlock mechanism comprising in combination:

at least one arresting rod attached to the movable die carrier member and extending axially rearwardly therefrom through the stationary support member;
an arresting unit for each arresting rod mounted on the rear side of the stationary support member; and
a control rod for each arresting unit attached on one extremity to the safety cover and extending axially rearwardly therefrom into cooperative engagement with the control unit; and wherein
the arresting rod has a succession of transverse grooves on that portion of its length which extends rearwardly beyond the stationary support member in the open position of the movable die carrier member;
the arresting unit includes two arresting jaws on diametrally opposite sides of the arresting rod with matching teeth engageable into the grooves of the arresting rod, the arresting jaws being guided for opposite transverse movements into and out of engagement with the arresting rod;
the arresting unit further includes means for resiliently biasing the arresting jaws into engagement with the arresting rod; and
the interlock mechanism further comprises control means defined by the control rod and the arresting unit for forcibly disengaging the arresting jaws from the arresting rod, in opposition to the jaw biasing means, when the safety cover is in the closed position, and for freeing the jaw biasing means to move the arresting jaws into engagement with the arresting rod, when the safety cover is retracted from the closed position.

2. A mechanical safety cover interlock mechanism as defined in claim 1, wherein
the mechanism is adapted for a die closing unit with four tie rods whose axes are arranged on the four corners of a regular rectangle, the mechanism comprising two arresting rods arranged in the vicinity of two diagonally oppositely located tie rods and two associated control rods arranged laterally outside the arresting rods.

3. A mechanical safety cover interlock mechanism as defined in claim 1, wherein
the transverse grooves of the arresting rod are annular grooves with planar flanks on the axially forwardly facing side of the grooves;
the arresting jaws have arcuate teeth with matching rearwardly facing flanks capable of engaging the planar flanks of said grooves over at least a substantial portion of their circumference.

4. A mechanical safety cover interlock mechanism as defined in claim 1 or claim 3, wherein
the transverse grooves of the arresting rod and the cooperating teeth of the arresting jaws have a sawtooth profile producing a ratchet action so that, in the engaged position, the jaws will positively block the forward movement of the arresting rod, but will yield transversely, in opposition to the jaw biasing means, under a rearward movement of the arresting rod, thereby limiting the stress on the arresting rod to primarily tensile stress.

5. A mechanical safety cover interlock mechanism as defined in claim 1 or claim 3, wherein
the arresting jaw biasing means includes at least one spring.

6. A mechanical safety cover interlock mechanism as defined in claim 1, wherein
the arresting unit further includes two cam followers engaging the control rod from diametrally opposite sides;
the control rod has two cam surfaces where it is engaged by the two cam followers, the cam surfaces having a symmetrical outline in relation to the control rod axis; and
the arresting unit further includes means for connecting each of the two cam followers to an arresting jaw in such a way that the arresting jaws move in unison with their cam followers.

7. A mechanical safety cover interlock mechanism as defined in claim 6, wherein
the control rod is a body of rotation, having a rear length portion of enlarged diameter which is engaged by the cam followers when the safety cover is closed, thereby separating the cam followers and their arresting jaws, in opposition to the jaw biasing means, the enlarged length portion of the control rod being adjoined forwardly by a transition portion and a main length portion of smaller diameter which allows the cam followers to approach and the arresting jaws to engage the arresting rod, when the safety cover is removed from its fully closed position.

8. A mechanical safety cover interlock mechanism as defined in claim 7, wherein
the control rod has a shallow annular groove in its enlarged portion allowing the cam followers to approach a small distance in a detent action, without engaging the arresting jaws with the arresting rod.

9. A mechanical safety cover interlock mechanism as defined in claim 6, wherein
the two arresting jaws and their connected cam followers are guided to move in the plane which is common to the axes of the arresting rod and control rod, along a movement axis which is perpendicular to both rods; and
the displacements of the arresting jaws in relation to the arresting rod axis are the same as those of the cam followers in relation to the control rod axis.

10. A mechanical safety cover interlock mechanism as defined in claim 9, wherein
the cam follower connecting means includes, for each cam follower, a cam follower shaft extending to both sides of the cam follower, and a pair of links on opposite sides of the cam follower, the links having their extremities connected to the cam follower shaft and to the associated arresting jaw, respectively; and
the arresting unit further includes, on each cam follower shaft, a pair of guide rollers arranged on opposite sides of the cam follower and, on the forward side of the arresting unit, where it is attached to the stationary die support member, a guide surface supporting the guide rollers for a straight-line movement of the cam followers along said movement axis.

11. A mechanical safety cover interlock mechanism as defined in claim 10, wherein
the two pairs of links connecting the cam followers to the arresting jaws are arranged in an overlapping relationship, the links connected to the distal cam follower being arranged on the inside of the links connected to the proximate cam follower, the former have elongated apertures accommodating the cam follower shaft of the proximate cam follower.

12. A mechanical safety cover interlock mechanism as defined in any one of claims 9 through 11, wherein
the arresting unit is enclosed within a box-shaped housing, the latter having parallel front and rear walls serving as guide walls for the arresting jaws and for the guide rollers of the cam followers; and
the arresting jaw biasing means includes two compression springs arranged between the arresting jaws and spring-supporting wall portions of the housing.

* * * * *